US012798595B2

(12) United States Patent
Han et al.

(10) Patent No.: US 12,798,595 B2
(45) Date of Patent: Nov. 17, 2026

(54) SYSTEM AND METHOD FOR MONITORING TORQUE IN A HYBRID ELECTRIC VEHICLE

(71) Applicants: HYUNDAI MOTOR COMPANY, Seoul (KR); KIA CORPORATION, Seoul (KR)

(72) Inventors: Jung Suk Han, Hwaseong-si (KR); Jae Hyoung Jeong, Seoul (KR); Hyung Min Kim, Ansan-si (KR); Jung Yong Choi, Hwaseong-si (KR); Sang Won Lee, Hwaseong-si (KR); Yeon Bok Kim, Seongnam-si (KR); Hyeok Jun Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 14 days.

(21) Appl. No.: 18/936,696

(22) Filed: Nov. 4, 2024

(65) Prior Publication Data

US 2025/0319890 A1 Oct. 16, 2025

(30) Foreign Application Priority Data

Apr. 12, 2024 (KR) ........................ 10-2024-0048991

(51) Int. Cl.
*B60W 50/038* (2012.01)

(52) U.S. Cl.
CPC ... *B60W 50/038* (2013.01); *B60W 2510/0657* (2013.01); *B60W 2510/083* (2013.01); *B60W 2540/10* (2013.01); *B60W 2540/12* (2013.01)

(58) Field of Classification Search
CPC ...... B60W 10/06; B60W 10/08; B60W 20/10; B60W 20/50; B60W 50/0205;
(Continued)

(56) References Cited

U.S. PATENT DOCUMENTS

| | | | | |
|---|---|---|---|---|
| 7,286,915 | B2 | 10/2007 | Lee | |
| 11,230,288 | B1 * | 1/2022 | Tokarz | B60W 20/40 |

(Continued)

FOREIGN PATENT DOCUMENTS

| | | | | |
|---|---|---|---|---|
| GB | 2594292 | A * | 10/2021 | B60W 10/08 |
| GB | 2599104 | A * | 3/2022 | B60W 30/18063 |

(Continued)

*Primary Examiner* — Atul Trivedi
(74) *Attorney, Agent, or Firm* — Lempia Summerfield Katz LLC

(57) ABSTRACT

A torque monitoring system and method for hybrid electric vehicles may monitor in real time whether a driver's requested torque is normally determined to prevent excessive deceleration and acceleration unintended by a driver while driving. The torque monitoring system includes a requested torque determination module configured to determine a driver's acceleration requested torque and a driver's deceleration requested torque. The system further includes a requested torque monitoring module configured to: determine a final upper limit requested torque to monitor the driver's acceleration requested torque and a final lower limit requested torque to monitor the driver's deceleration requested torque; limit an upper limit value of the driver's acceleration requested torque through the final upper limit requested torque; and limit a lower limit value of the driver's deceleration requested torque through the final lower limit requested torque.

16 Claims, 9 Drawing Sheets

(58) Field of Classification Search
CPC ......... B60W 50/038; B60W 2050/021; B60W 2510/0657; B60W 2510/083; B60W 2200/92; B60W 2520/10; B60W 2540/10; B60W 2540/12; B60W 2710/083; Y02T 10/62
USPC ........................................................... 701/22
See application file for complete search history.

(56) References Cited

U.S. PATENT DOCUMENTS

| | | | | |
|---|---|---|---|---|
| 2007/0102206 | A1 | 5/2007 | Lee | |
| 2010/0004809 | A1* | 1/2010 | Itoh | B60W 20/15 701/22 |
| 2011/0257854 | A1* | 10/2011 | Whitney | B60W 50/0097 701/54 |
| 2012/0123624 | A1* | 5/2012 | Sato | B60L 15/20 701/22 |
| 2016/0368471 | A1* | 12/2016 | Cho | B60W 10/08 |
| 2017/0291506 | A1* | 10/2017 | Yim | B60L 15/2009 |
| 2017/0361831 | A1* | 12/2017 | Johri | B60W 20/13 |
| 2018/0134298 | A1* | 5/2018 | Johri | B60W 20/10 |
| 2018/0251131 | A1* | 9/2018 | Doering | B60W 20/10 |
| 2018/0281775 | A1* | 10/2018 | Lee | B60W 20/12 |
| 2019/0118830 | A1* | 4/2019 | Kwon | B60W 50/10 |
| 2020/0122709 | A1* | 4/2020 | Cunningham | F02D 13/0207 |
| 2020/0165987 | A1* | 5/2020 | Cunningham | B60W 20/00 |
| 2020/0180631 | A1* | 6/2020 | Na | B60W 10/06 |
| 2020/0331455 | A1* | 10/2020 | Meyer | B60K 6/52 |
| 2020/0398844 | A1* | 12/2020 | Ruybal | B60W 10/08 |
| 2021/0254677 | A1* | 8/2021 | Wesolowski | B60K 6/38 |
| 2022/0009476 | A1* | 1/2022 | Cho | B60W 10/02 |
| 2022/0227349 | A1* | 7/2022 | Aratake | B60W 20/20 |
| 2023/0119802 | A1* | 4/2023 | Park | B60K 6/387 701/22 |
| 2023/0125618 | A1* | 4/2023 | Hawley | B60W 10/18 701/70 |
| 2023/0192065 | A1* | 6/2023 | Hayashima | B60W 30/16 |
| 2023/0339453 | A1* | 10/2023 | Kim | B60K 6/387 |
| 2023/0339489 | A1* | 10/2023 | Roques | B60K 6/448 |
| 2024/0083254 | A1* | 3/2024 | Cho | B60L 7/18 |
| 2025/0058644 | A1* | 2/2025 | Oh | B60L 15/20 |
| 2025/0083658 | A1* | 3/2025 | Park | B60W 20/10 |
| 2025/0319890 | A1* | 10/2025 | Han | B60W 10/08 |

FOREIGN PATENT DOCUMENTS

| | | | | | |
|---|---|---|---|---|---|
| GB | 2633793 | A | * | 3/2025 | B60L 58/15 |
| GB | 2633801 | A | * | 3/2025 | B60W 40/076 |
| GB | 2633807 | A | * | 3/2025 | B60W 10/188 |
| KR | 20070050997 | A | | 5/2007 | |
| KR | 101063225 | B1 | * | 9/2011 | B60W 20/50 |
| KR | 102012159 | B1 | * | 8/2019 | B60W 30/18072 |

* cited by examiner

SYSTEM AND METHOD FOR MONITORING TORQUE IN A HYBRID ELECTRIC VEHICLE

CROSS-REFERENCE TO RELATED APPLICATION

This application claims under 35 U.S.C. § 119(a) the benefit of priority to Korean Patent Application No. 10-2024-0048991 filed on Apr. 12, 2024, the entire contents of which are incorporated herein by reference.

BACKGROUND

(a) Technical Field

The present disclosure relates to a torque monitoring system and method for hybrid electric vehicles that may improve a problem of occurrence of excessive torque due to an incorrect torque command caused by a software error or a hardware error.

(b) Background Art

A hybrid electric vehicle is a vehicle that travels using an engine and a motor as power sources. As one of powertrain types for hybrid electric vehicles, a transmission mounted electric device (TMED)-type hybrid system is known.

In the conventional TMED-type hybrid system, an engine and a motor, which are driving devices to drive a vehicle, are arranged in series. A transmission, which shifts power from the engine and the motor and transmits the power to the drive shaft of the vehicle, is connected to the output side of the motor.

A controller of the conventional TMED-type hybrid system calculates a driver's requested torque depending on the opening ratio (%) of an accelerator pedal depressed by a driver. Further, in order to determine the driver's requested torque, the controller calculates a creep torque generated when the vehicle drives without depressing the accelerator pedal and a brake pedal, a regenerative braking torque generated when the brake pedal is depressed, and a cruise torque generated when cruise control is activated.

If any one of these torques is calculated incorrectly due to a software problem or a hardware problem of the controller, the driver's requested torque is ultimately calculated incorrectly.

Depending on a level at which the driver's requested torque is calculated incorrectly, an unintended excessive vehicle torque may occur. This may result in excessive deceleration and/or acceleration of the vehicle.

However, the controller of the conventional TMED-type hybrid system may not detect incorrect calculation of the driver's requested torque and the resulting excessive vehicle torque, which may occur due to the software problem or the hardware problem of the controller. Therefore, an incorrect torque command from the controller may thereby cause an excessive torque of the vehicle and excessive deceleration and/or acceleration of the vehicle.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. Objects of the present disclosure are to provide a torque monitoring system and a method for hybrid electric vehicles that may monitor in real time whether a driver's requested torque is normally determined to prevent excessive deceleration and acceleration unintended by a driver while driving.

The objects of the present disclosure are not limited to the above-mentioned objects. Other objects not mentioned herein should be more clearly understood by those having ordinary skill in the art to which the present disclosure pertains from the following description.

In one aspect, the present disclosure provides a torque monitoring system for hybrid electric vehicles. The torque monitoring system includes a requested torque determination module configured to determine a driver's acceleration requested torque and a driver's deceleration requested torque. The torque monitoring system also includes a requested torque monitoring module configured to: determine a final upper limit requested torque to monitor the driver's acceleration requested torque and a final lower limit requested torque to monitor the driver's deceleration requested torque; limit an upper limit value of the driver's acceleration requested torque through the final upper limit requested torque; and limit a lower limit value of the driver's deceleration requested torque through the final lower limit requested torque.

In an embodiment, the requested torque monitoring module may determine the driver's acceleration requested torque to be the same value as the final upper limit requested torque when the driver's acceleration requested torque is greater than the final upper limit requested torque.

In another embodiment, the requested torque monitoring module may determine the driver's deceleration requested torque to be the same value as the final lower limit requested torque when the driver's deceleration requested torque is smaller than the final lower limit requested torque.

In still another embodiment, the driver's acceleration requested torque and the driver's deceleration requested torque determined by the requested torque determination module may be stored in a first memory. The final upper limit requested torque and the final lower limit requested torque determined by the requested torque monitoring module may be stored in a second memory.

In yet another embodiment, the requested torque monitoring module may determine the final upper limit requested torque and the final lower limit requested torque in the same task cycle as a task cycle in which the requested torque determination module determines the driver's acceleration requested torque and the driver's deceleration requested torque.

In still yet another embodiment, the requested torque determination module may determine the driver's acceleration requested torque based on a first acceleration requested torque and a first creep torque. The requested torque monitoring module may determine the final upper limit requested torque based on a second acceleration requested torque, a second creep torque, and an upper limit margin torque.

In a further embodiment, the requested torque determination module may determine the driver's deceleration requested torque based on a first regenerative braking torque and a first creep torque. The requested torque monitoring module may determine the final lower limit requested torque based on a second regenerative braking torque, a second creep torque, and a lower limit margin torque.

In another further embodiment, the requested torque determination module may determine a first acceleration requested torque based on an accelerator pedal position value, a driving mode of a vehicle, and a vehicle speed. The requested torque monitoring module may determine a second acceleration requested torque based on the accelerator pedal position value, a driving mode for monitoring, and the vehicle speed. The driving mode for monitoring may be a driving mode in which a largest acceleration requested torque occurs among driving modes of the vehicle based on the same variable data.

In still another further embodiment, the requested torque determination module may determine a first creep torque based on a shift gear position, a vehicle speed, and a braking amount. The requested torque monitoring module may determine a second creep torque based on the same variable data as the variable data used when the first creep torque is determined by the requested torque determination module.

In yet another further embodiment, the requested torque determination module may determine a first regenerative braking torque based on a basic regenerative braking torque, shift efficiency, and a regenerative braking torque decrement. The requested torque monitoring module may determine a second regenerative braking torque based on the same variable data as the variable data used when the first regenerative braking torque is determined by the requested torque determination module.

In another aspect, the present disclosure provides a torque monitoring method for hybrid electric vehicles. The torque monitoring method includes determining, by a requested torque determination module, a driver's acceleration requested torque based on an accelerator pedal position value. The torque monitoring method also includes determining, by the requested torque determination module, a driver's deceleration requested torque based on a brake pedal position value. The torque monitoring method also includes determining, by a requested torque monitoring module, a final upper limit requested torque to monitor the driver's acceleration requested torque. The torque monitoring method also includes determining, by the requested torque monitoring module, a final lower limit requested torque to monitor the driver's deceleration requested torque. The torque monitoring method also includes determining, by the requested torque monitoring module, an upper limit value of the driver's acceleration requested torque as the final upper limit requested torque. The torque monitoring method also includes determining, by the requested torque monitoring module, a lower limit value of the driver's deceleration requested torque as the final lower limit requested torque.

Other aspects and embodiments of the disclosure are discussed below.

The above and other features of the disclosure are discussed below.

BRIEF DESCRIPTION OF THE DRAWINGS

The above and other features of the present disclosure are described in detail with reference to certain example embodiments thereof illustrated in the accompanying drawings, which are given hereinbelow by way of illustration only, and thus are not limitative of the present disclosure.

Figure 1:
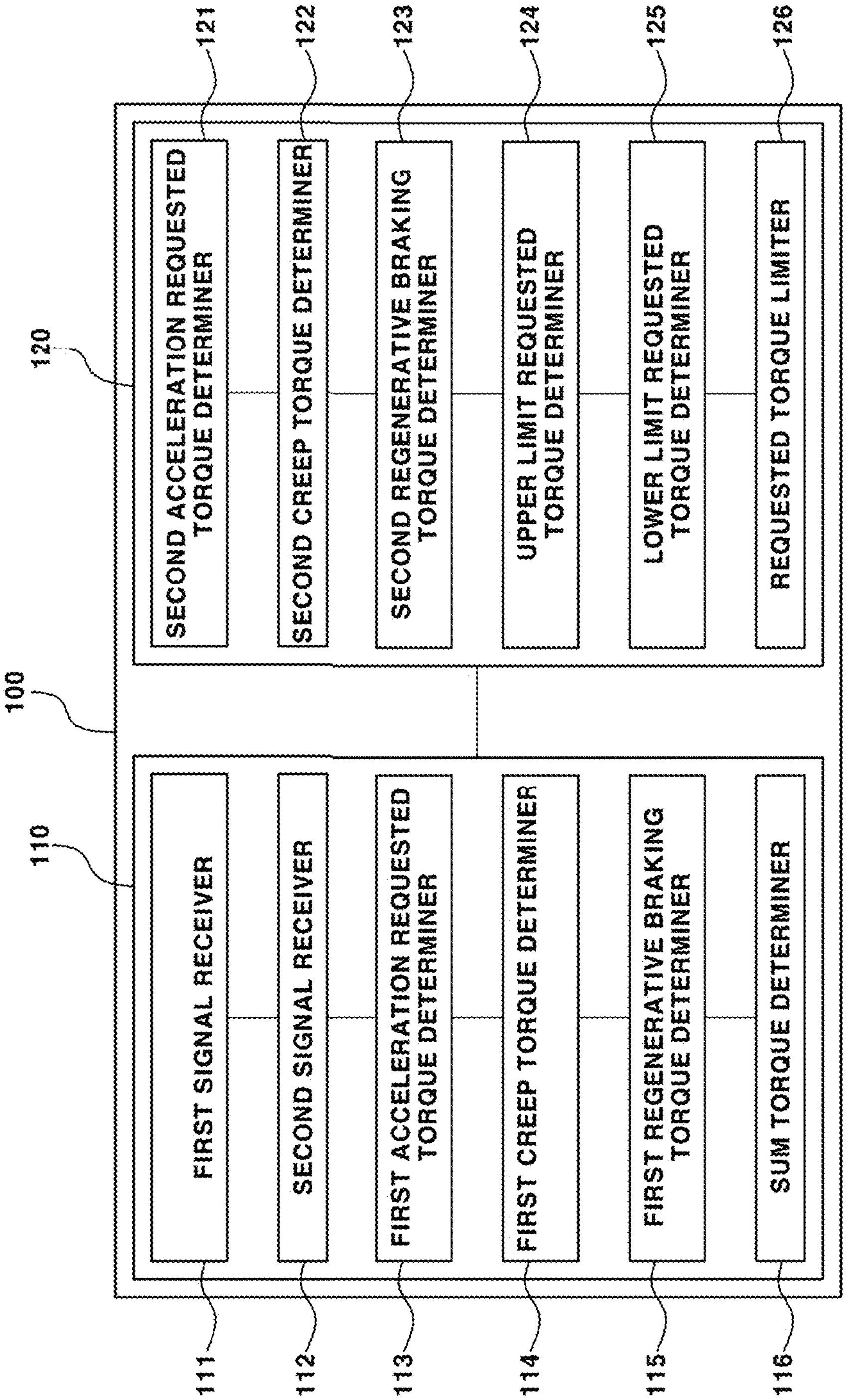
FIG. 1 is a block diagram showing the configuration of a torque monitoring system for hybrid electric vehicles according to an embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described with reference to the accompanying drawings. Subject matter included in the accompanying drawings is schematic to easily explain the embodiments of the present disclosure and may differ from an actually implemented form.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When a component, device, element, part, unit, module, portion, or the like of the present disclosure is described as having a purpose or performing an operation, function, or the like, the component, device, element, part, unit, module, portion, or the like should be considered herein as being "configured to" meet that purpose or to perform that operation or function. Each component, device, element, part, unit, module, portion, or the like may separately embody or be included with a processor and a memory, such as a non-transitory computer readable media, as part of the apparatus.

The present disclosure provides a torque monitoring system for hybrid electric vehicles that prevents incorrect calculation of a driver's requested torque and a resulting occurrence of excessive torque of the vehicle. The torque monitoring system monitors in real time whether the driver's requested torque is calculated normally and prevents excessive deceleration and acceleration unintended by a driver by limiting the upper and lower limit values of the driver's requested torque.

A hybrid electric vehicle may be a hybrid electric vehicle equipped with a transmission mounted electric device (TMED)-type hybrid system.

The hybrid electric vehicle is provided with a controller 100, which may monitor whether the driver's requested torque is incorrectly calculated. The controller 100 may be in charge of a vehicle's torque control strategy depending on a driver's request and may be an upper level controller already mounted in the hybrid electric vehicle. The controller 100 may monitor in real time whether a driver's requested torque value is normally calculated and may monitor whether the driver's requested torque is reliable.

As shown in FIG. 1, the controller 100 includes a requested torque determination module 110 configured to calculate and determine the driver's requested torque. The controller 100 also includes a requested torque monitoring module 120 configured to monitor the driver's requested torque determined by the requested torque determination module 110 in real time.

The requested torque monitoring module 120 may monitor in real time the driver's requested torque calculated and determined by the requested torque determination module 110 through a monitoring torque.

The controller 100 may monitor whether the driver's requested torque determined by the requested torque determination module 110 is reliable though the requested torque monitoring module 120.

The requested torque determination module 110 may include a first signal receiver 111, a second signal receiver 112, a first acceleration requested torque determiner 113, a first creep torque determiner 114, a first regenerative brake torque determiner 115, and a sum torque determiner 116, in order to calculate and determine the driver's requested torque.

The first signal receiver 111 may be configured to receive position information of an accelerator pedal generated by driver operation. The first signal receiver 111 may receive a position value of the accelerator pedal from an accelerator pedal position sensor (APS) provided in the hybrid electric vehicle.

The second signal receiver 112 may be provided to receive a brake signal generated by driver operation. The brake signal may include information about the operation amount of a brake pedal (i.e., a brake pedal position value) by the driver. The second signal receiver 112 may receive the brake signal from a controller (i.e., a braking controller) of an integrated electronic brake (IEB) system provided in the hybrid electric vehicle.

The first acceleration requested torque determiner 113 calculates and determines a first acceleration requested torque based on a driving mode of the hybrid electric vehicle and a real-time vehicle speed in addition to the position value (i.e., opening amount) of the accelerator pedal received from the first signal receiver 111.

The driving mode of the vehicle may be determined as one of an eco mode, a normal mode, and a sport mode, which are set in advance. The driving mode of the vehicle may be manually set by the driver. The driver may change and determine the driving mode of the vehicle through a driving mode determination unit provided inside the vehicle.

In general, the eco mode is a driving mode in which operation of an engine and a transmission is controlled to prioritize fuel efficiency and may improve fuel efficiency compared to the normal mode. The sport mode is a driving mode in which driving performance is improved by increasing sensitivity of the accelerator pedal compared to the normal mode.

Accordingly, even if the accelerator pedal position value and the vehicle speed are the same, a first acceleration requested torque value calculated by the first acceleration requested torque determiner 113 varies depending on the driving mode of the vehicle. When the opening amount of the accelerator pedal and the vehicle speed are all the same, the magnitude value of the acceleration requested torque in each driving mode increases in the order of the eco mode, the normal mode, and the sport mode. In other words, an acceleration requested torque value in the eco mode is the smallest, and an acceleration requested torque value in the sport mode is the largest.

Figure 2:
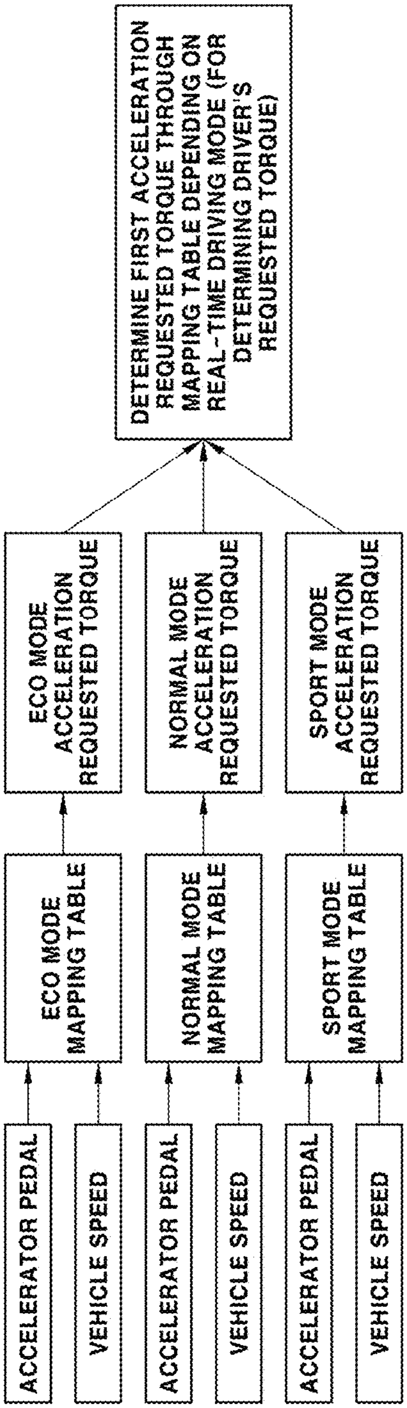
FIG. 2 is a conceptual diagram showing a method of determining an acceleration requested torque by a requested torque determination module according to an embodiment of the present disclosure.

As shown in FIG. 2, the first acceleration requested torque determiner 113 calculates the acceleration requested torque value in each driving mode using a mapping table selected from among an eco mode mapping table, a normal mode mapping table, and a sport mode mapping table. The eco mode mapping table, the normal mode mapping table, and the sport mode mapping table may be created in advance and stored in a first memory of the controller 100.

The eco mode mapping table is used to determine the acceleration requested torque when the real-time driving mode of the vehicle is the eco mode. The eco mode mapping table is configured to determine the acceleration requested torque based on the opening amount of the accelerator pedal and the vehicle speed. The normal mode mapping table is used to determine the acceleration requested torque when the real-time driving mode of the vehicle is the normal mode. The normal mode mapping table is configured to determine the acceleration requested torque based on the opening amount of the accelerator pedal and the vehicle speed. The sport mode mapping table is used to determine the acceleration requested torque when the real-time driving mode of the vehicle is the sport mode. The sport mode mapping table is configured to determine the acceleration requested torque based on the opening amount of the accelerator pedal and the vehicle speed.

The first acceleration requested torque determiner 113 may determine the first acceleration requested torque using one mapping table selected from among the mapping tables based on the real-time driving mode.

The requested torque determination module 110 may store the first acceleration requested torque value determined by the first acceleration requested torque determiner 113 in the first memory. Although not specifically shown, the first memory may be provided in the controller 100.

The creep torque occurs under the condition in which there is no driver intention to accelerate or decelerate. The creep torque is generated by a motor for driving the vehicle when the driver does not operate the accelerator pedal and the brake pedal. For example, the creep torque occurs when operation of the accelerator pedal is released during acceleration or operation of the brake pedal is released during deceleration.

In calculating and determining the driver's requested torque, the creep torque is calculated as a significant value when a signal of the accelerator pedal and a signal of the brake pedal are not generated. Accordingly, the creep torque determiner 114 calculates and determines a first creep torque value under the condition in which the signal of the accelerator pedal and the signal of the brake pedal are not generated.

The creep torque determiner 114 calculates and determines the first creep torque value based on a gear position of a transmission, the vehicle speed, and a braking amount. The creep torque determiner 114 determines a basic creep torque value using a creep torque mapping table selected based on a real-time gear position and determines a decrement in the basic creep torque (i.e., a creep torque decrement) using a creep torque decrement mapping table.

In the first memory of the controller 100, creep torque mapping tables for determining the basic creep torque in each paddle brake mode (i.e., creep torque mapping tables for respective paddle brake modes) are created in advance and stored. The paddle brake mode is a mode determined based on a shift gear position of a paddle shifter operated by the driver. A real-time paddle brake mode is determined depending on the shift gear position of the paddle shifter selected and determined by the driver. The creep torque mapping tables are configured to determine the basic creep torque based on the gear position and the vehicle speed.

The paddle shifter is a type of gear shift device and is usually installed on the steering wheel of a vehicle. The shift gear position may be changed and determined in real time by operation of the paddle shifter by the driver. The gear position may be shifted to a higher gear position or a lower gear position step by step through manual operation of the paddle shifter.

Figure 3:
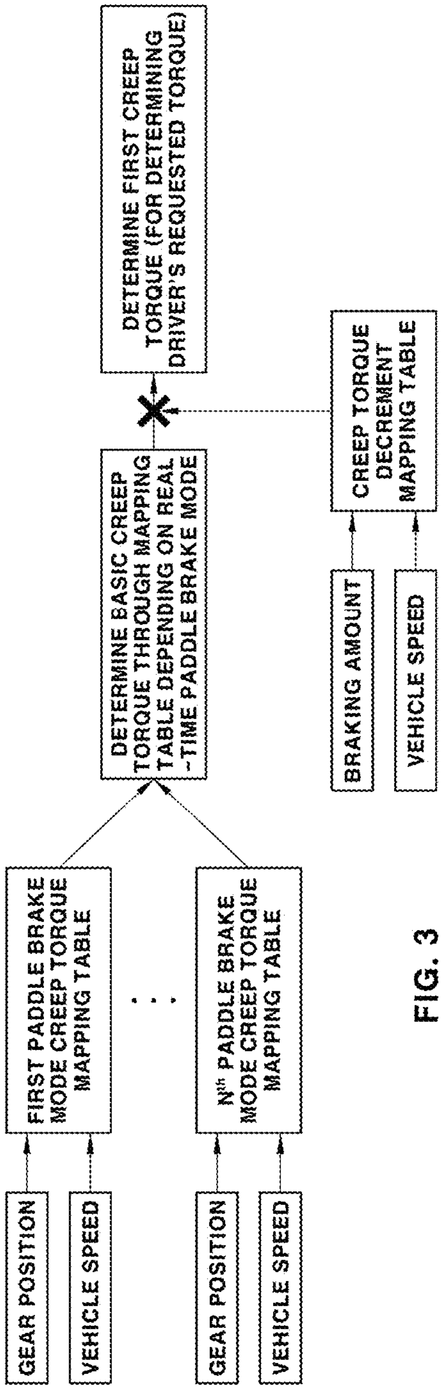
FIG. 3 is a conceptual diagram showing a method of determining a final creep torque by the requested torque determination module according to an embodiment of the present disclosure.
Figure 4:
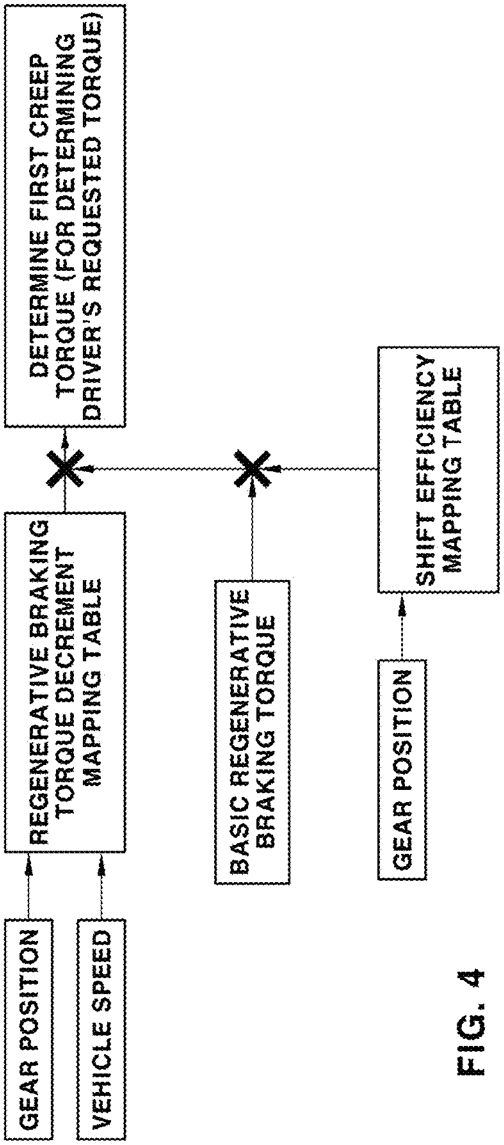
FIG. 4 is a conceptual diagram showing a method of determining a final regenerative braking torque by the requested torque determination module according to an embodiment of the present disclosure.

The shift gear position may be shifted to a higher gear position or a lower gear position by operation of the paddle shifter by the driver and the paddle brake mode may be changed in real time thereby. Referring to FIG. 3, one creep torque mapping table from among the creep torque mapping tables for the respective paddle brake modes is selected depending on the real-time paddle brake mode. The basic creep torque value is determined through the selected creep torque mapping table. In other words, the basic creep torque is determined through one creep torque mapping table selected from among the creep torque mapping tables stored in the first memory of the controller 100 based on the real-time gear position.

The first paddle brake mode to the $n^{th}$ paddle brake mode (n=2, 3, 4, . . . ) may be set in each shift gear position of the paddle shifter. The creep torque mapping tables for the respective paddle brake modes may determine different basic creep torque values based on the same variable data (i.e., the shift gear position and the vehicle speed). The creep torque mapping tables for the respective paddle brake modes may map different basic creep torque values in a driving situation in which the shift gear position and the vehicle speed are the same.

Further, referring to FIG. 3, the creep torque decrement mapping table may be configured to determine the creep torque decrement based on the braking amount and the vehicle, and may be stored in advance in the first memory of the controller 100. The braking amount may be determined depending on the amount of the brake pedal depressed by the driver (i.e., the position value of the brake pedal), and real-time data on the braking amount may be provided from a braking controller (i.e., a controller of an integrated electric brake system) in the vehicle.

The first creep torque determiner 114 calculate and determines a first creep torque (i.e., final creep torque) value as a value obtained by multiplying the basic creep torque determined through the creep torque mapping table by the creep torque decrement determined through the creep torque decrement mapping table. The first creep toque value is calculated through a vector product of the basic creep torque and the creep torque decrement. The first creep torque value determined by the first creep torque determiner 114 may be stored in the first memory of the controller 100.

The first regenerative braking torque determiner 115 is configured to calculate and determine a final regenerative braking torque (i.e., first regenerative braking torque) based on a basic regenerative braking torque and a regenerative braking torque decrement generated during deceleration and shift efficiency.

The basic regenerative braking torque is generated and determined depending on the position value of the brake pedal. Real-time data on the basic regenerative braking torque is provided from the braking controller.

The regenerative braking torque decrement is determined based on the gear position of the transmission and the vehicle speed. For this purpose, a regenerative braking torque decrement mapping table configured to determine the regenerative braking torque decrement using the gear position of the transmission and the vehicle speed as variables is used.

The shift efficiency is determined through a shift efficiency mapping table. The shift efficiency mapping table is configured to determine the shift efficiency based on the gear position. The regenerative braking torque decrement mapping table and the shift efficiency mapping table may be stored in advance in the first memory of the controller 100.

A plurality of regenerative braking torque decrement mapping tables may be stored in advance in the first memory. The regenerative braking torque decrement mapping tables may be separately created depending on vehicle driving conditions in which the regenerative braking torque decrement varies in a driving situation in which a regenerative braking torque is generated. For example, a separate regenerative braking torque decrement mapping table may be created and used in each vehicle driving condition in which the regenerative braking torque decrement varies, such as when the vehicle is driven in the sport mode, when operation of the accelerator pedal by the driver is released, when a certain gear shift occurs, or the like.

The braking controller may calculate and determine the basic regenerative braking torque value based on the position value of the brake pedal when the driver depresses the brake pedal and may transmit and provide the determined basic regenerative braking torque value to the first regenerative braking torque determiner 115.

The first regenerative braking torque determiner 115 may calculate and determine the first regenerative braking torque (i.e., final regenerative braking torque) value as a value obtained by multiplying the basic regenerative braking torque by the shift efficiency and the regenerative braking torque decrement. The first regenerative braking torque value is calculated through a vector product of the basic regenerative braking torque, the shift efficiency, and the regenerative braking torque decrement. The first regenerative braking torque value determined by the first regenerative braking torque determiner 115 may be stored in the first memory of the controller 100.

The sum torque determiner 116 determines a driver's acceleration requested torque and a driver's deceleration requested torque based on the first acceleration requested torque determined by the first acceleration requested torque determiner 113, the first creep torque determined by the first creep torque determiner 114, and the first regenerative braking torque determined by the first regenerative braking torque determiner 115.

The sum torque determiner 116 may determine the driver's acceleration requested torque and the driver's deceleration requested torque using variable data (i.e., the first acceleration requested torque, the first creep torque, and the first regenerative braking torque) stored in the first memory.

The sum torque determiner 116 determines the driver's acceleration requested torque as the sum of the first acceleration requested torque and the first creep torque during acceleration. The sum torque determiner 116 also determines the driver's deceleration requested torque as the sum of the first regenerative braking torque and the first creep torque during deceleration.

The sum torque determiner 116 sums the first acceleration requested torque and the first creep torque when calculating a driver's requested torque affecting acceleration of the vehicle (i.e., the driver's acceleration requested torque). The sum torque determiner 116 also sums the first regenerative braking torque and the first creep torque when calculating a driver's requested torque affecting deceleration of the vehicle (i.e., the driver's deceleration requested torque).

The sum torque determiner 116 may separately calculate the driver's acceleration requested torque and the driver's deceleration requested torque. The sum torque determiner 116 may store the driver's acceleration requested torque value and the driver's deceleration requested torque value in the first memory of the controller 100.

Further, in order to appropriately secure or improve drivability and fuel efficiency, the sum torque determiner 116 calculates and applies a filter value and a rate value when determining the driver's acceleration requested torque and the driver's deceleration requested torque.

The requested torque monitoring module 120 may include a second acceleration requested torque determiner 121, a second creep torque determiner 122, a second regenerative braking torque determiner 123, an upper limit requested torque determiner 124, a lower limit requested torque determiner 125, and a requested torque limiter 126.

The requested torque monitoring module 120 may receive variable data from the requested torque determination module 110, or may receive variable data from sensors, the braking controller, and the like in the vehicle separately from the requested torque determination module 110. The variable data is data necessary to determine a second acceleration requested torque, a second regenerative braking torque, a final upper limit requested torque, and a final lower limit requested torque. The variable date specifically includes the position value of the accelerator pedal, a vehicle speed value, a gear position value, and the like.

In other words, the requested torque monitoring module 120 may independently receive variable data necessary to calculate the final upper limit requested torque and the final lower limit requested torque separately from the requested torque determination module 110. Accordingly, even if a part of the requested torque determination module 110 is damaged, the requested torque monitoring module 120 may operate normally.

Although not shown in FIG. 1, the requested torque monitoring module 120 may include a signal receiver provided separately from the first signal receiver 111 and the second signal receiver 112 in order to receive the variable data separately from the requested torque determination module 110.

In addition, the controller 100 may further include an element configured to monitor whether the requested torque monitoring module 120 is operating normally. The element may monitor whether the requested torque monitoring module 120 normally monitors the requested torque determination module 110. This is because, if the requested torque monitoring module 120 does not operate normally, monitoring of the requested torque determination module 110 is not possible.

In the present disclosure, the requested torque monitoring module 120 must operate normally even when a part of the requested torque determination module 110 is damaged. Therefore, in addition to the variable data, a memory, tasks, mapping tables, and the like used to calculate monitoring torques (i.e., the final upper limit requested torque and the final lower limit requested torque), are allocated to the requested torque monitoring module 120 separately from the requested torque determination module 110.

For example, in order to calculate the monitoring torques of the requested torque monitoring module 120, the controller 100 may allocate a memory (i.e., a second memory) provided separately from the first memory to the requested torque monitoring module 120.

The requested torque monitoring module 120 may store the final upper limit requested torque determined by the upper limit requested torque determiner 124 and the final lower limit requested torque determined by the lower limit requested torque determiner 125 in the second memory. The requested torque limiter 126 may monitor the driver's requested torque value in real time by calling for driver's requested torque data stored in the first memory and final upper limit requested torque data and final lower limit requested torque data stored in the second memory.

In addition, in the present disclosure, the requested torque monitoring module 120 calculates the final upper limit requested torque and the final lower limit requested torque in the same task cycle as the requested torque determination module 110. In order to monitor the driver's acceleration requested torque and the driver's deceleration requested torque determined by the requested torque determination module 110 in real time, the requested torque monitoring module 120 determines the final upper limit requested torque and the final lower limit requested torque in the same task cycle as a task cycle in which the requested torque determination module 110 determines the driver's acceleration requested torque and the driver's deceleration requested torque.

The second acceleration requested torque determiner 121 calculates and determines an acceleration requested torque (i.e., second acceleration requested torque) in a similar manner to the first acceleration requested torque determiner 113. In other words, when determining the second acceleration requested torque, the second acceleration requested torque determiner 121 is the same as the first acceleration requested torque determiner 113 in that the acceleration requested torque is determined using the accelerator pedal position value, the vehicle speed value, and a mapping table. However, the second acceleration requested torque determiner 121 differs from the first acceleration requested torque determiner 113 in that mapping tables for the respective driving modes are not used.

The second acceleration requested torque determiner 121 uses one predetermined mapping table (i.e., a mapping table set in a driving mode for monitoring). In the present disclosure, the driving mode for monitoring is set to the sport mode.

Figure 5:
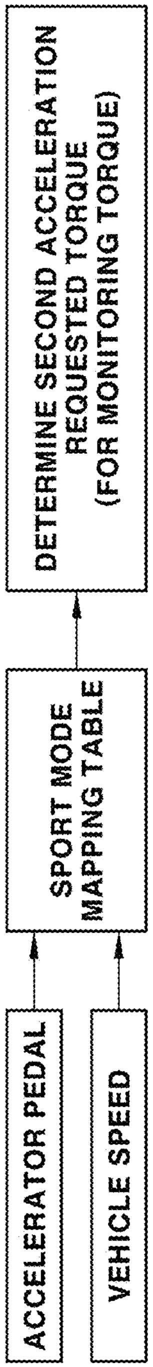
FIG. 5 is a conceptual diagram showing a method of determining an acceleration requested torque by a requested torque monitoring module according to an embodiment of the present disclosure.

Referring to FIG. 5, the second acceleration requested torque determiner 121 determines the second acceleration requested torque based on the accelerator pedal position value, the real-time vehicle speed, and the sport mode mapping table.

The sport mode mapping table is a mapping table configured to determine the largest requested torque value among the mapping tables for the respective driving modes of the vehicle. In other words, the sport mode mapping table determines the acceleration requested torque having the largest value compared to the eco mode mapping table and the normal mode mapping table if both the accelerator pedal position value and the real-time speed are the same. Therefore, regardless of the driving mode of the vehicle, it is possible to limit the driver's acceleration requested torque through the final upper limit requested torque value determined based on the second acceleration requested torque value.

As the second acceleration requested torque determiner 121 uses only one mapping table (i.e., the sport mode mapping table), a memory capacity allocated to the requested torque monitoring module 120 may be reduced, and the processing speed of the requested torque monitoring module 120 may be improved. The second acceleration requested torque determiner 121 uses a sport mode mapping table configured identically to the sport mode mapping table used in the first acceleration requested torque determiner 113.

The second creep torque determiner 122 determines a final creep torque (i.e., a second creep torque) in the same manner as the first creep torque determiner 114 of the requested torque determination module 110. In other words, the second creep torque determiner 122 determines the second creep torque based on the same variable data as the variable data used in the first creep torque determiner 114 when the first creep torque is determined by the first creep torque determiner 114.

Figure 6:
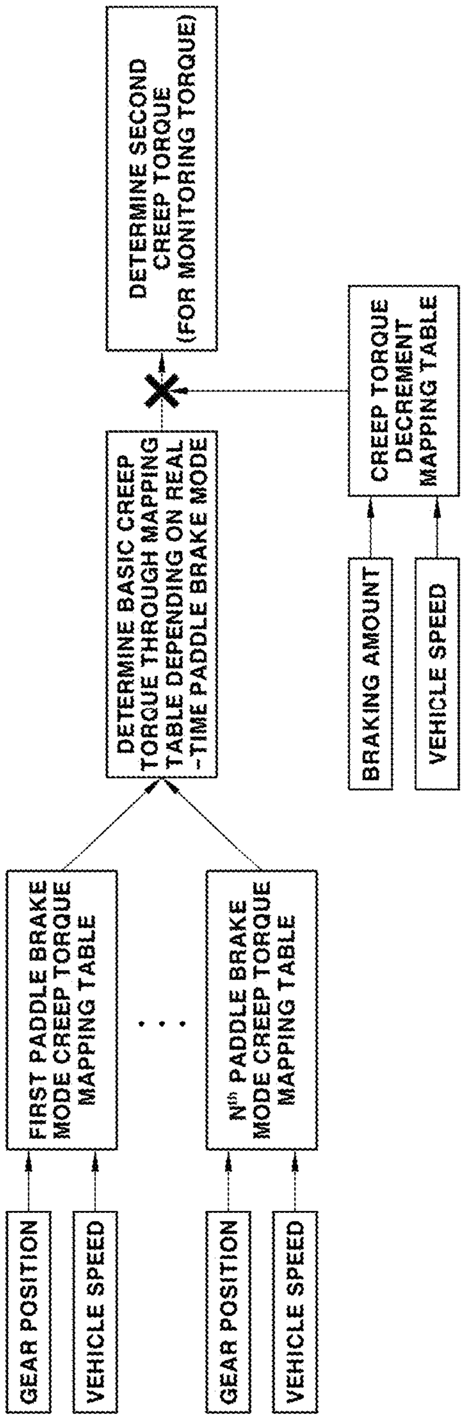
FIG. 6 is a conceptual diagram showing a method of determining a final creep torque by the requested torque monitoring module according to an embodiment of the present disclosure.

Referring to FIG. 6, the second creep torque determiner 122 determines the second creep torque as a value obtained by multiplying a basic creep torque determined through a creep torque mapping table and a creep torque decrement determined through a creep torque decrement mapping table. The second creep torque determiner 122 may use the creep torque mapping table selected based on a real-time paddle brake mode.

The creep torque mapping table is configured to determine the basic creep torque based on a gear position value and a vehicle speed value and is stored in the second memory of the controller 100. The creep torque decrement mapping table is configured to determine the creep torque decrement based on the braking amount and the vehicle speed value and is stored in the second memory of the controller 100.

In addition, the second regenerative braking torque determiner 123 also determines a final regenerative braking torque (i.e., second regenerative braking torque) in the same manner as the first regenerative braking torque determiner 115. In other words, the second regenerative braking torque determiner 123 determines the second regenerative braking torque based on the same variable data as the variable data used in the first regenerative braking torque determiner 115 when the first regenerative braking torque is determined by the first regenerative braking torque determiner 115.

Figure 7:
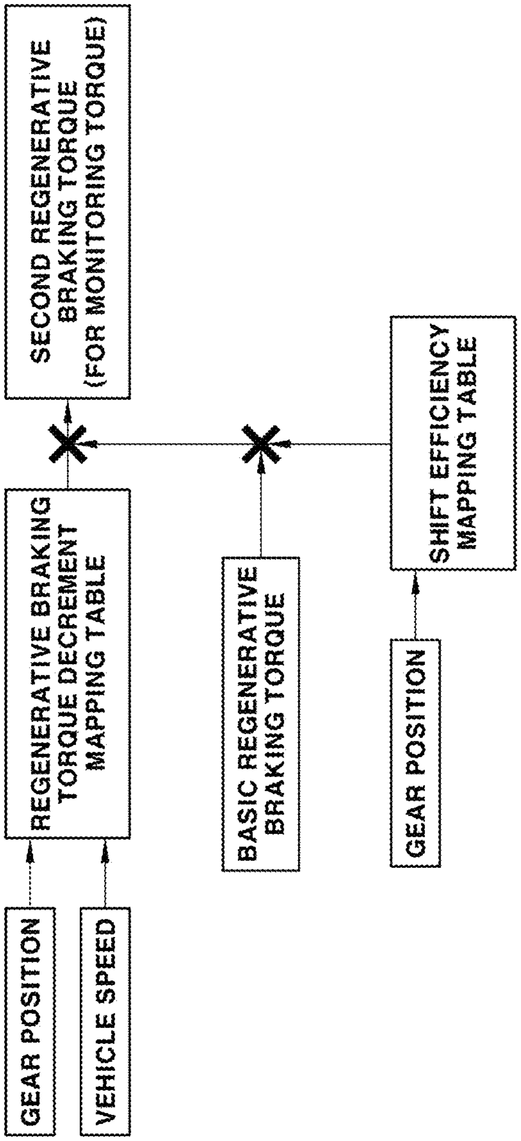
FIG. 7 is a conceptual diagram showing a method of determining a final regenerative braking torque by the requested torque monitoring module according to an embodiment of the present disclosure.

Referring to FIG. 7, the second regenerative braking torque determiner 123 determines the second regenerative braking torque as a value obtained by multiplying a basic regenerative braking torque transmitted from the braking controller, a regenerative braking torque decrement determined through a regenerative braking torque decrement mapping table, and a shift efficiency determined through the shift efficiency mapping table.

The regenerative braking torque decrement mapping table is configured to determine the regenerative braking torque decrement based on the gear position and the vehicle speed. The shift efficiency mapping table is configured to determine the shift efficiency based on the gear position. The regenerative braking torque decrement mapping table and the shift efficiency mapping table are created in in advance and stored in the second memory of the controller 100.

The upper limit requested torque determiner 124 determines a basic upper limit requested torque value as a value obtained by summing the second acceleration requested torque determined by the second acceleration requested torque determiner 121 and the second creep torque determined by the second creep torque determiner 122.

Further, the upper limit requested torque determiner 124 determines a final upper limit requested torque value as a value obtained by adding a determined upper limit margin torque to the basic upper limit requested torque value. The upper limit margin torque value may be determined as a value of 10% of the maximum wheel torque of the vehicle. The maximum wheel torque is the maximum torque value of a vehicle wheel which may be generated based on a current driving speed (i.e., a real-time driving speed) and a current shift gear position. For example, the upper limit margin torque value may be determined as a value which is 10% of the maximum wheel torque of the vehicle which occurs when driving at low speeds (i.e., when the shift gear position is the first gear). The maximum wheel torque may have the greatest value when driving at low speeds, and unintentional acceleration may be felt most significantly when driving at low speeds.

The upper limit requested torque determiner 124 determines the final upper limit requested torque value for the purpose of monitoring the positive value of the final driver's requested torque (i.e., the driver's acceleration requested torque).

Further, in order to secure and improve drivability and fuel efficiency, the upper limit requested torque determiner 124 may calculate and apply a filter value and a rate value when determining the final upper limit requested torque. The rate value is set so that the final upper limit requested torque rises faster and falls slower than the driver's acceleration requested torque. This is to prevent torque misdetection of the requested torque monitoring module 120.

The lower limit requested torque determiner 125 determines a basic lower limit requested torque value as a value obtained by summing the second regenerative braking torque determined by the second regenerative braking torque determiner 123 and the second creep torque determined by the second creep torque determiner 122.

Further, the lower limit requested torque determiner 125 determines a final lower limit requested torque value as a value obtained by subtracting a determined lower limit margin torque from the basic lower limit requested torque value. The lower limit margin torque value may be determined as a value which is 10% of the maximum wheel torque of the vehicle.

The lower limit requested torque determiner 125 determines the final lower limit requested torque value for the purpose of monitoring the negative value of the final driver's requested torque (i.e., the driver's deceleration requested torque).

Further, in order to secure and improve drivability and fuel efficiency, the lower limit requested torque determiner 125 may calculate and apply the filter value and the rate value when determining the final lower limit requested torque. The rate value is set so that the final lower limit requested torque rises slower and falls faster than the driver's deceleration requested torque.

The requested torque limiter 126 determines whether the driver's acceleration requested torque and the driver's deceleration requested torque determined by the sum torque determiner 116 are overcalculated based on the final upper limit requested torque and the final lower limit requested torque.

For this purpose, the requested torque limiter 126 compares the driver's acceleration requested torque and the driver's deceleration requested torque with the final upper limit requested torque and the final lower limit requested torque, respectively. As a result of the comparison, if the driver's acceleration requested torque exceeds the final upper limit requested torque or the driver's deceleration requested torque is less than the final lower limit requested torque, the requested torque limiter 126 determines that the driver's acceleration requested torque or the driver's deceleration requested torque is overcalculated.

The requested torque limiter 126 may compare a final driver's requested torque, i.e., the driver's acceleration requested torque or the driver's deceleration requested torque, with the final upper limit requested torque or the final lower limit requested torque by receiving data stored in the first memory and the second memory.

Figure 8:
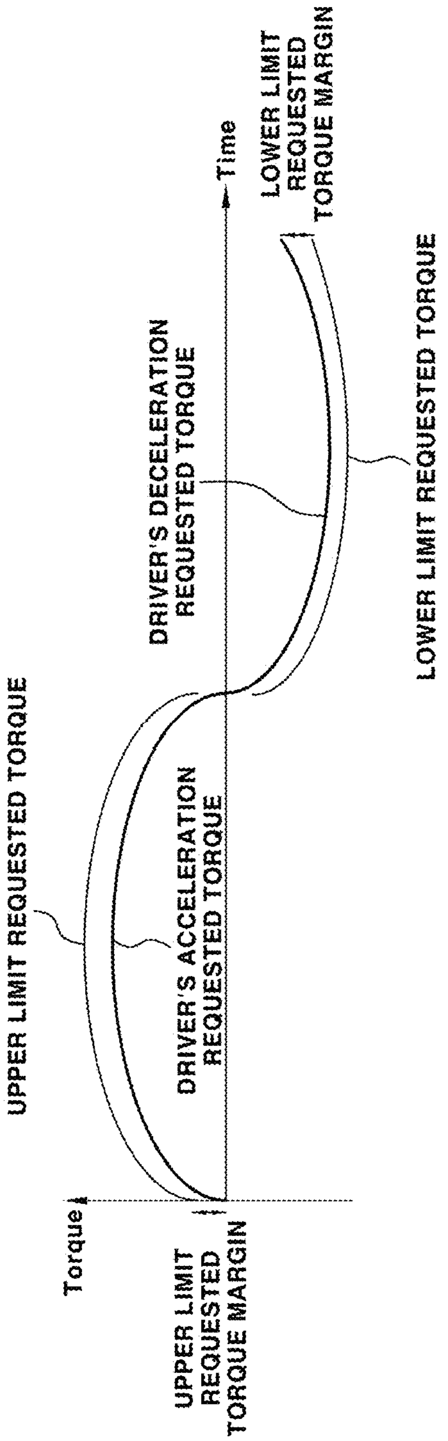
FIG. 8 is a graph showing a driver's requested torque and a monitoring torque determined according to an embodiment of the present disclosure.

Referring to FIG. 8, the final upper limit requested torque is calculated as a positive value and is used to limit the upper limit value of the final driver requested torque determined during acceleration (i.e., the driver's acceleration requested torque). Based on the highest point of an upper limit requested torque graph shown in FIG. 8, a section in which the final upper limit requested torque increases is determined by the second acceleration requested torque value, and a section in which the final upper limit requested torque decreases is determined by the second creep torque value.

During acceleration, the second acceleration requested torque and the second creep torque occur sequentially with a time difference. The second acceleration requested torque occurs while the driver depresses the accelerator pedal, and the second creep torque occurs from the moment when the driver takes his or her foot off the accelerator pedal. Further, during acceleration, the final lower limit requested torque is calculated as 0 Nm.

Also, referring to FIG. 8, the final lower limit requested torque is calculated as a negative value, and is used to limit the lower limit value of the final driver requested torque determined during deceleration (i.e., the driver's deceleration requested torque. Based on the lowest point of a lower limit requested torque graph shown in FIG. 8, a section in which the final lower limit requested torque decreases is determined by the second regenerative braking torque value. Also, a section in which the final upper limit requested torque increases is determined by the second creep torque value.

During deceleration, the second regenerative braking torque and the second creep torque occur sequentially with a time difference. The second regenerative braking torque occurs while the driver depresses the brake pedal. The second creep torque occurs from the moment when the driver takes his or her foot off the brake pedal. Further, during deceleration, the final upper limit requested torque is calculated as 0 Nm.

Figure 9:
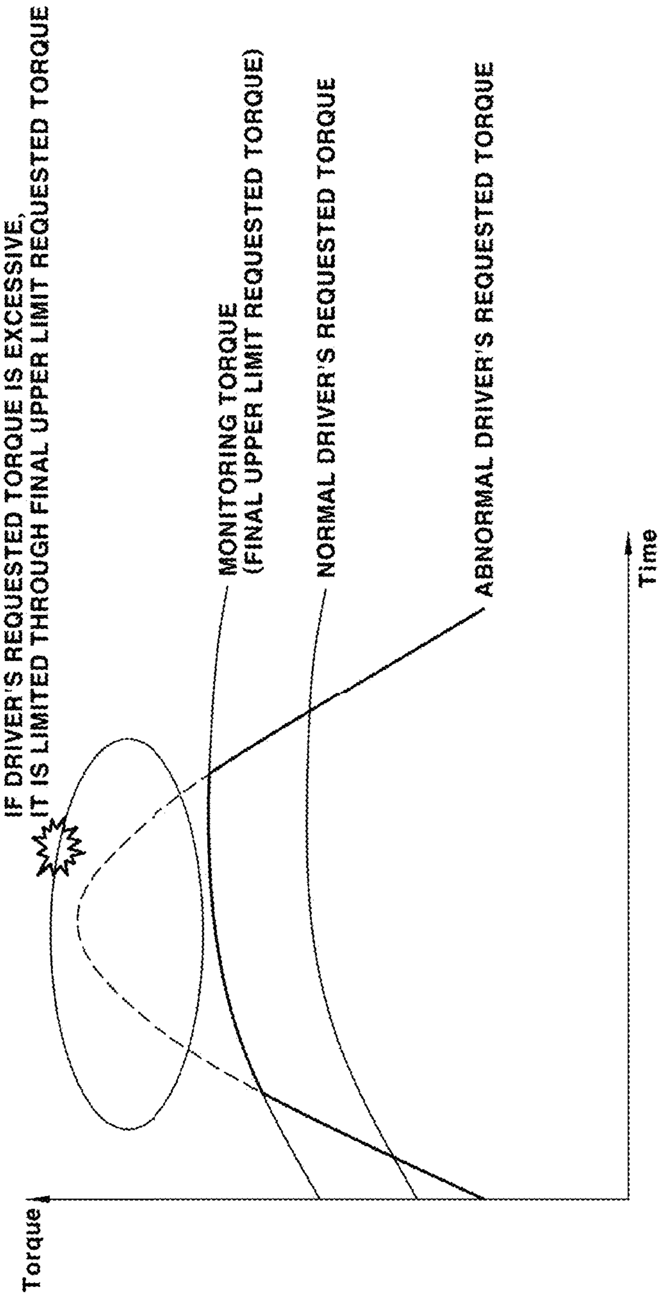
FIG. 9 is a graph showing a method of limiting a driver's requested torque according to an embodiment of the present disclosure.

As shown in FIG. 9, if the driver's acceleration requested torque value for determined by the sum torque determiner 116 during acceleration is abnormally determined and exceeds the final upper limit requested torque value, the requested torque limiter 126 limits the upper limit value of the driver's acceleration requested torque to the final upper limit requested torque value. In this case, the driver's acceleration requested torque value is determined to be the same value as the final upper limit requested torque value.

Further, if the driver's deceleration requested torque value determined by the sum torque determiner 116 during deceleration is abnormally determined and is smaller than the final lower limit requested torque value, the requested torque limiter 126 limits the lower limit value of the driver's acceleration requested torque to the final lower limit requested torque value. In this case, the driver's deceleration requested torque is determined to be the same value as the final lower limit requested torque value.

In this way, upon determining that the final driver's requested torque (i.e., the driver's acceleration requested torque or the driver's deceleration requested torque) is overcalculated compared to the final upper limit requested torque or the final lower limit requested torque, the requested torque limiter 126 replaces the driver's acceleration requested torque with the final upper limit requested torque during acceleration, or replaces the driver's deceleration requested torque with the final lower limit requested torque during deceleration.

Accordingly, the controller 100 may issue a torque command for acceleration of the vehicle based on the driver's acceleration requested torque determined to be the same value as the final upper limit requested torque value. Further, the controller 100 may issue a torque command for deceleration of the vehicle based on the driver's deceleration requested torque determined to be the same value as the final lower limit requested torque value.

As a result, the present disclosure may prevent incorrect calculation of the final driver's requested torque and unintended acceleration and deceleration of the vehicle caused thereby.

Further, in the present disclosure, a reliable driver's requested torque value may be determined even if the final driver's requested torque is incorrectly calculated due to a software error or a hardware error. This is because the requested torque monitoring module 120 uses a memory, tasks, and mapping tables provided separately from the requested torque determination module 110.

As is apparent from the above description, the preset disclosure allows a driver's requested torque determined by a requested torque determination module to be monitored in real time through a separate requested torque monitoring module. Thus, incorrect determination of the driver's requested torque and excessive acceleration and deceleration of a vehicle caused thereby may be prevented. Also, reliability of the driver's requested torque is secured.

The effects of the present disclosure are not limited to the above effects. Other effects of the present disclosure that are not mentioned should be more clearly understood by those having ordinary skill in the art to which the present disclosure pertains from the above description.

The technical concepts have been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A torque monitoring system for hybrid electric vehicles, the torque monitoring system comprising:

a requested torque determination module configured to determine a driver's acceleration requested torque and a driver's deceleration requested torque; and a requested torque monitoring module configured to determine a final upper limit requested torque to monitor the driver's acceleration requested torque and a final lower limit requested torque to monitor the driver's deceleration requested torque, limit an upper limit value of the driver's acceleration requested torque through the final upper limit requested torque, and limit a lower limit value of the driver's deceleration requested torque through the final lower limit requested torque, wherein the requested torque monitoring module is configured to determine the driver's acceleration requested torque to be the same value as the final upper limit requested torque when the driver's acceleration requested torque determined by the requested torque determination module is greater than the final upper limit requested torque, and wherein the requested torque monitoring module is configured to determine the driver's deceleration requested torque to be the same value as the final lower limit requested torque when the driver's deceleration requested torque determined by the requested torque determination module is smaller than the final lower limit requested torque.

2. The torque monitoring system of claim 1, wherein the driver's acceleration requested torque and the driver's deceleration requested torque determined by the requested torque determination module are stored in a first memory, and wherein the final upper limit requested torque and the final lower limit requested torque determined by the requested torque monitoring module are stored in a second memory.

3. The torque monitoring system of claim 1, wherein the requested torque monitoring module configured to determine the final upper limit requested torque and the final lower limit requested torque in the same task cycle as a task cycle in which the requested torque determination module determines the driver's acceleration requested torque and the driver's deceleration requested torque.

4. The torque monitoring system of claim 1, wherein:

the requested torque determination module configured to determine the driver's acceleration requested torque based on a first acceleration requested torque and a first creep torque; and the requested torque monitoring module determines the final upper limit requested torque based on a second acceleration requested torque, a second creep torque, and an upper limit margin torque.

5. The torque monitoring system of claim 1, wherein:

the requested torque determination module determines the driver's deceleration requested torque based on a first regenerative braking torque and a first creep torque; and the requested torque monitoring module determines the final lower limit requested torque based on a second regenerative braking torque, a second creep torque, and a lower limit margin torque.

6. The torque monitoring system of claim 1, wherein:

the requested torque determination module configured to determine a first acceleration requested torque based on an accelerator pedal position value, a driving mode of a vehicle, and a vehicle speed;

the requested torque monitoring module configured to determine a second acceleration requested torque based on the accelerator pedal position value, a driving mode for monitoring, and the vehicle speed; and the driving mode for monitoring is a driving mode in which a largest acceleration requested torque occurs among driving modes of the vehicle based on the same variable data.

7. The torque monitoring system of claim 1, wherein:

the requested torque determination module configured to determine a first creep torque based on a shift gear position, a vehicle speed, and a braking amount; and the requested torque monitoring module configured to determine a second creep torque based on the same variable data as a variable data used when the first creep torque is determined by the requested torque determination module.

8. The torque monitoring system of claim 1, wherein:

the requested torque determination module configured to determine a first regenerative braking torque based on a basic regenerative braking torque, shift efficiency, and a regenerative braking torque decrement; and the requested torque monitoring module configured to determine a second regenerative braking torque based on the same variable data as a variable data used when the first regenerative braking torque is determined by the requested torque determination module.

9. A torque monitoring method for hybrid electric vehicles, the torque monitoring method comprising:

determining, by a requested torque determination module, a driver's acceleration requested torque based on an accelerator pedal position value;

determining, by the requested torque determination module, a driver's deceleration requested torque based on a brake pedal position value;

determining, by a requested torque monitoring module, a final upper limit requested torque to limit an upper limit value of the driver's acceleration requested torque;

determining, by the requested torque monitoring module, a final lower limit requested torque to limit a lower limit value of the driver's deceleration requested torque;

determining, by the requested torque monitoring module, the driver's acceleration requested torque to be the same value as the final upper limit requested torque when the driver's acceleration requested torque determined by the requested torque determination module is greater than the final upper limit requested torque; and determining, by the requested torque monitoring module, the driver's deceleration requested torque to be the same value as the final lower limit requested torque when the driver's deceleration requested torque determined by the requested torque determination module is smaller than the final lower limit requested torque.

10. The torque monitoring method of claim 9, wherein the driver's acceleration requested torque and the driver's deceleration requested torque determined by the requested torque determination module are stored in a first memory, and wherein the final upper limit requested torque and the final lower limit requested torque determined by the requested torque monitoring module are stored in a second memory.

11. The torque monitoring method of claim 9, wherein the requested torque monitoring module determines the final upper limit requested torque and the final lower limit requested torque in the same task cycle as a task cycle in which the requested torque determination module determines the driver's acceleration requested torque and the driver's deceleration requested torque.

12. The torque monitoring method of claim 9, wherein:

the requested torque determination module determines the driver's acceleration requested torque based on a first acceleration requested torque and a first creep torque; and the requested torque monitoring module determines the final upper limit requested torque based on a second acceleration requested torque, a second creep torque, and an upper limit margin torque.

13. The torque monitoring method of claim 9, wherein:

the requested torque determination module determines the driver's deceleration requested torque based on a first regenerative braking torque and a first creep torque; and the requested torque monitoring module determines the final lower limit requested torque based on a second regenerative braking torque, a second creep torque, and a lower limit margin torque.

14. The torque monitoring method of claim 9, wherein:

the requested torque determination module determines a first acceleration requested torque based on the accelerator pedal position value, a driving mode of a vehicle, and a vehicle speed;

the requested torque monitoring module determines a second acceleration requested torque based on the accelerator pedal position value, a driving mode for monitoring, and the vehicle speed; and the driving mode for monitoring is a driving mode in which a largest acceleration requested torque occurs among driving modes of the vehicle based on the same variable data.

15. The torque monitoring method of claim 9, wherein:

the requested torque determination module determines a first creep torque based on a shift gear position, a vehicle speed, and a braking amount; and the requested torque monitoring module determines a second creep torque based on the same variable data as the variable data used when the first creep torque is determined by the requested torque determination module.

16. The torque monitoring method of claim 9, wherein:

the requested torque determination module determines a first regenerative braking torque based on a basic regenerative braking torque, shift efficiency, and a regenerative braking torque decrement; and the requested torque monitoring module determines a second regenerative braking torque based on the same variable data as the variable data used when the first regenerative braking torque is determined by the requested torque determination module.

* * * * *